Feb. 20, 1962  W. J. SACKETT, SR  3,022,142
AMMONIATOR-GRANULATOR APPARATUS
Filed Feb. 17, 1958  4 Sheets-Sheet 1

INVENTOR
Walter J. Sackett, Sr.
BY Walter G. Finch
ATTORNEY

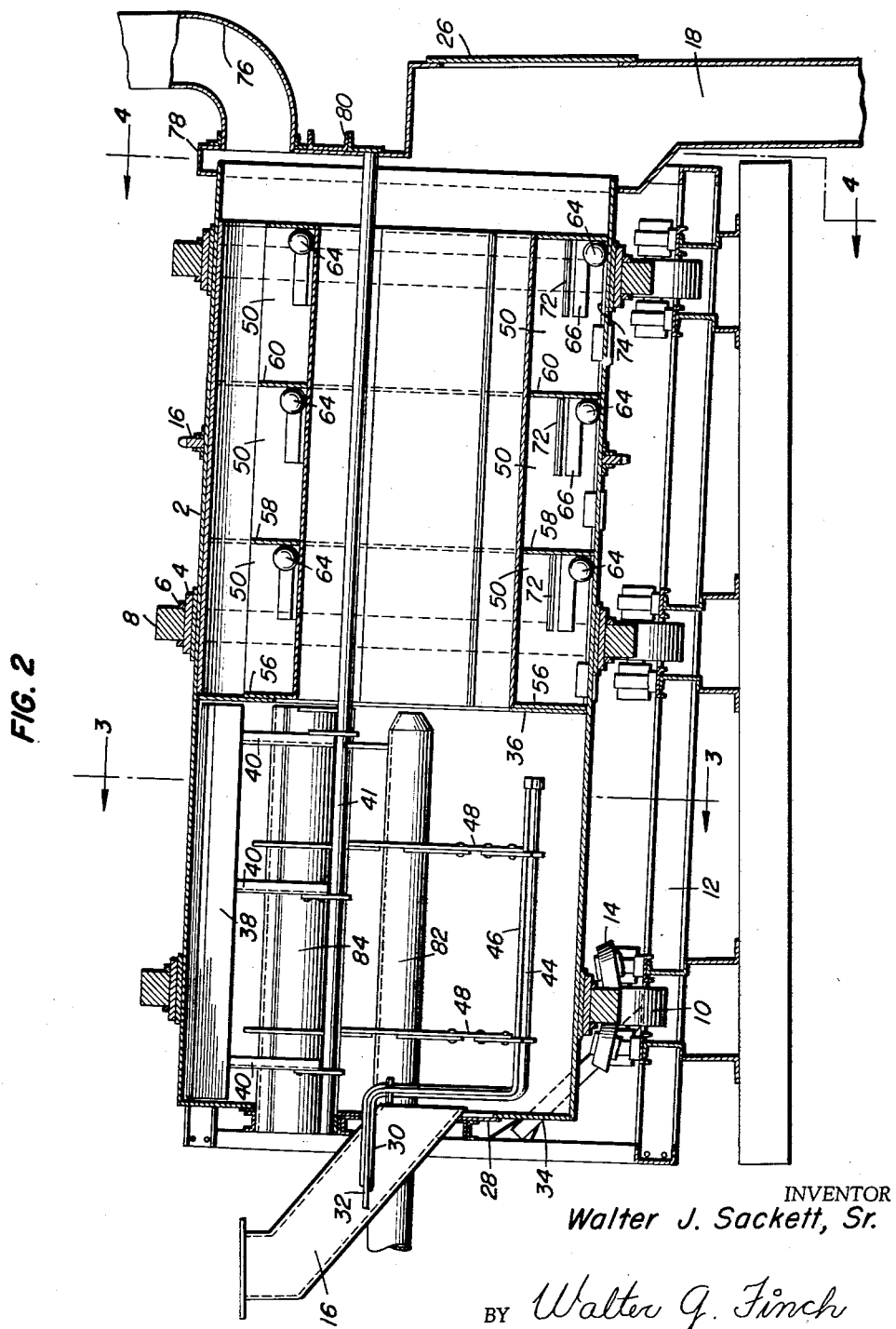

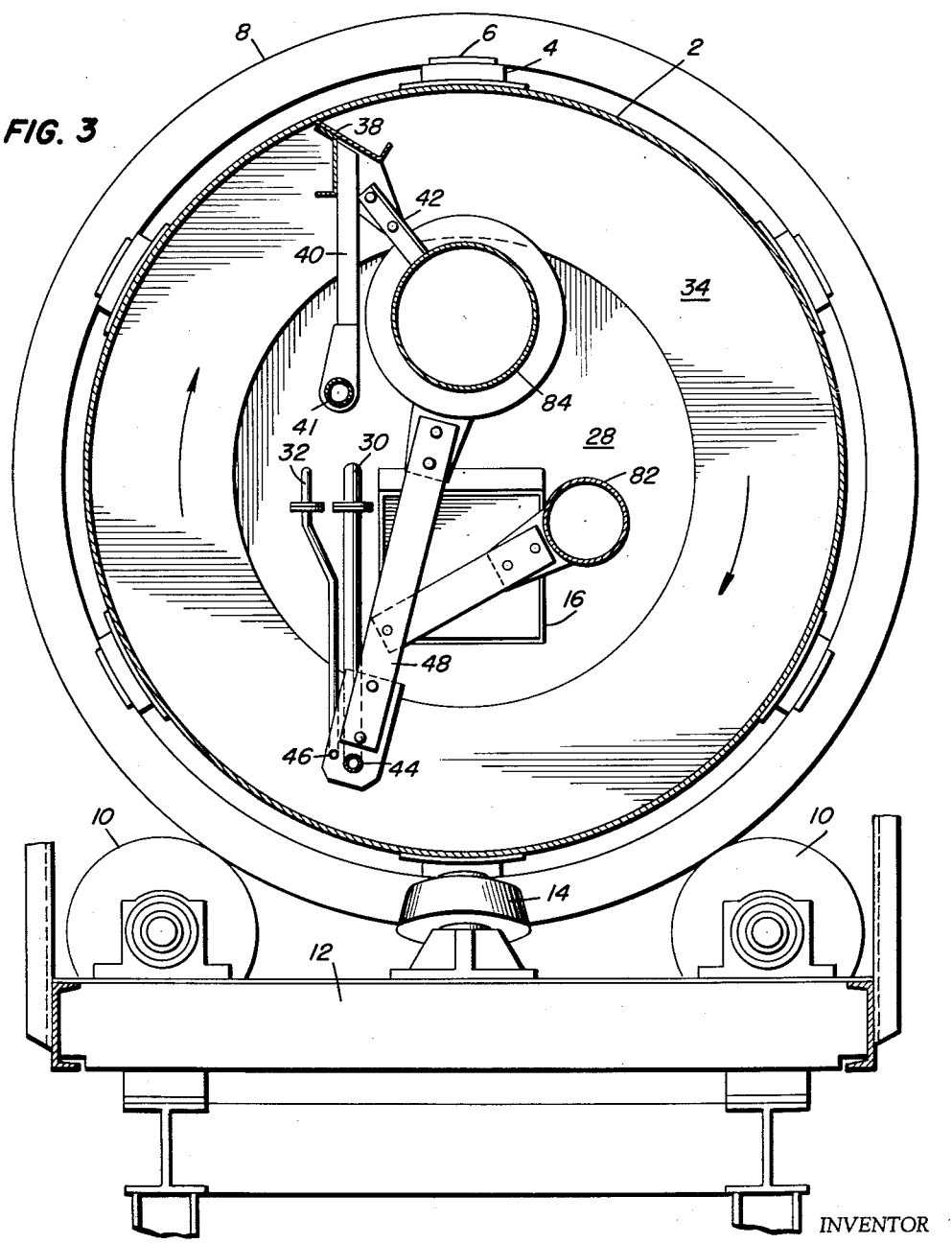

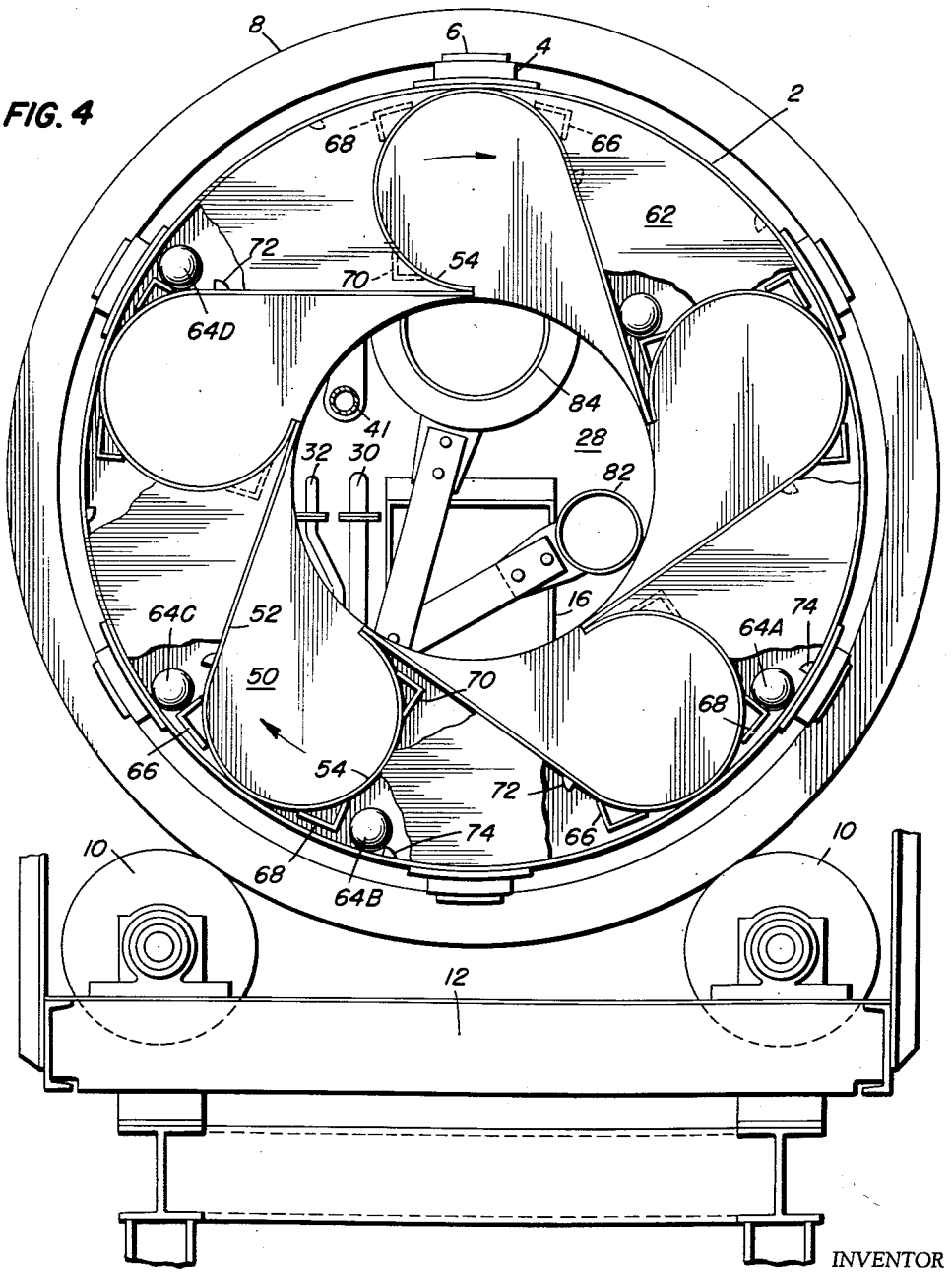

3,022,142
AMMONIATOR-GRANULATOR APPARATUS
Walter J. Sackett, Sr., Baltimore, Md., assignor to The A. J. Sackett & Sons Company, Baltimore, Md., a corporation of Maryland
Filed Feb. 17, 1958, Ser. No. 715,648
3 Claims. (Cl. 23—259.1)

This invention relates generally to fertilizer producing apparatus, and more particularly it pertains to a combined ammoniator-granulator apparatus for the production of fertilizer or the like material in granulated or pelletized form.

The manufacture of high-analysis fertilizers by an ammonia treatment process is described in detail by F. T. Nielsson in U.S. Patent No. 2,729,554 for "Ammoniation of Superphosphate," issued on January 3, 1956. Apparatus for carrying out this ammonia treatment process is described by F. T. Nielsson in U.S. Patent No. 2,741,545, entitled "Apparatus for Ammoniation of Superphosphate," which was issued on April 10, 1956. He also shows an apparatus for this purpose in U.S. Patent No. 2,741,545. The Tennessee Valley Authority, Division of Chemical Development, Wilson Dam, Alabama, in a paper entitled "Granulation of High-Analysis Fertilizers," by L. B. Hein, J. C. Hicks, Julius Silverberg, and L. F. Seatz, dated October 28, 1955, points out the desirable properties of treated fertilizer in granular form.

Briefly, the ammoniation process involves the mixing of ammonia and an acid with fertilizer or other material whereupon a chemical reaction takes place forming a re-enforced plant food. The product is removed and dried and packaged for commercial sale in bags. An acceptable product flows easily and does not set or cake in the bag. Large lumps are undesirable, but, on the other hand, a fine product results in high loss as dust.

In actual practice, efforts are made to produce agglomerated grains of material of certain uniform size and a screening process rejects the oversize and undersize. Large lumps are crushed and fed back with the fines to the start of the processing where they are intermixed with the new raw material to undergo another try at acceptable granulation. In the past, sometimes over one-half of the initial material input has failed to form into granules of acceptable six mesh screen pass and twenty four mesh screen retention.

To reduce these losses, a separate improved granulator featuring pocket and plane members to roll pellets from granules dropped through a surface hardening flow of air has been developed. This apparatus is described in a copending application of applicant, entitled "Granulator," Serial No. 569,892, filed March 6, 1956, now Patent No. 2,871,510. An improved granulator apparatus for agglomerating moist powdered materials is also described in another copending application of applicant's entitled "Apparatus for Forming Powdered Materials in Granules or Pellets," Serial No. 617,215, filed October 19, 1956, now abandoned.

The object of the present invention is to combine the functions of this improved granulator of my first patent application with an ammoniator of the type described in the above-mentioned patents for producing a more superior commercially acceptable fertilizer product.

Another object of this invention is to provide an apparatus of more compactness than heretofore available.

Still another object of this invention is to provide an apparatus of the ammoniator-granulator type which will give a greater yield than previous machines.

A further object of this invention is to combine the reaction by-products of ammoniation and the granulation of fertilizers to their mutual utilization and benefit.

And another object of this invention is to provide a combined ammoniator-granulator where the flow of material will be continuous without necessity for additional handling means.

And yet another object of this invention is to provide a fertilizer producing machine which will operate more continuously and automatically than other previously developed machines or apparatus.

These and other objects and advantages of this invention will become more readily apparent from the following detailed description of the invention and accompanying drawings in which:

FIG. 2 is a longitudinal cross-section depicting the same apparatus of FIG. 1 in greater detail;

FIG. 3 is a cross-section taken along line 3—3 of FIG. 2; and

FIG. 4 is a cross-section taken on line 4—4 of FIG. 2.

Figure 1:
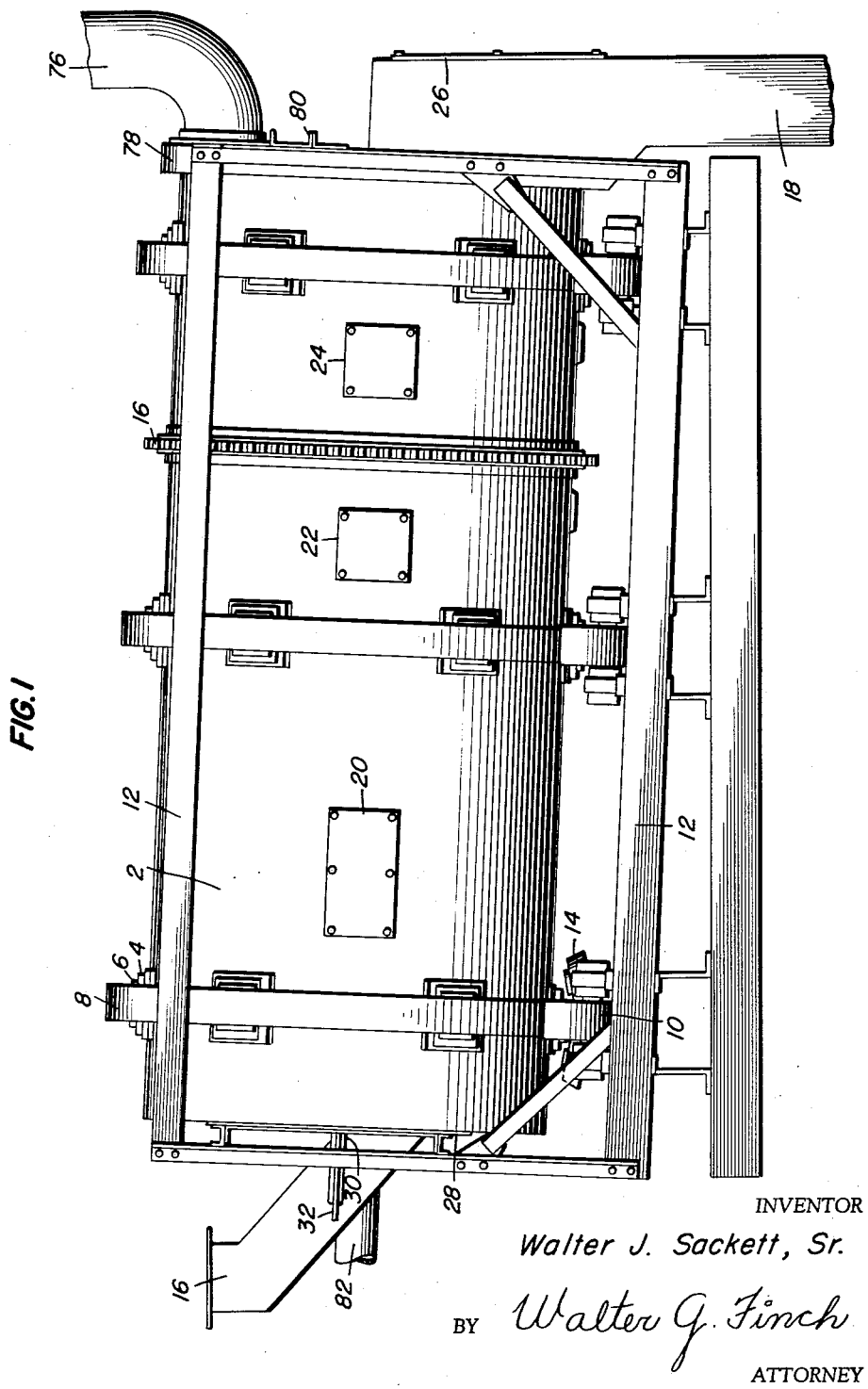
FIG. 1 is a side elevation of one preferred device of the combined ammoniator-granulator apparatus embodying the features of this invention.

In the present invention, the combined ammoniator-granulator apparatus measures only approximately six feet in diameter and twelve feet in length. The material to be treated is introduced in the conventional manner into the receiving end of the ammoniator. The revolving unit is canted so that the material will progress by gravity from the receiving end of the ammoniator through the ammoniator into the improved granulator and out of the discharge end for further drying, cooling and product classifying. The details of construction and the interaction of the functions of the two processes render the resultant apparatus a true combination rather than a mere aggregation of the parts.

Referring now to FIG. 1 of the drawing, a rotary drum is designated by the reference numeral 2. Upon this drum 2, there are provided circumferentially spaced bearing blocks 4. Small strips 6, welded to the blocks 4, hold bearing rings 8 which support the drum 2 adjacent to the ends and intermediate to the ends upon rollers 10.

A framework 12, supporting the rollers 10, mounts the drum 2 on a slight angle with the horizontal, with the inlet end of the drum being higher so that the material placed in the drum 2 will slowly work toward the other end of the drum. Additional rollers 14, which bear upon the sides of one ring 8, restrain longitudinal movement of the drum 2.

A sprocket ring 16 is placed around the drum 2. This ring 16 is rotated by a chain drive from a source of motive power not shown. A feed chute 16 is provided at the inlet end of the drum 2 and a discharge chute 18 is provided at the outlet end thereof. Removable plates 20, 22, 24, and 26 cover hand holes for access to the interior of the ammoniator-granulator machine.

The interior of the ammoniator-granulator machine is best shown in FIGS. 2, 3, and 4. A circular closure plate 28 is fixed to the framework 12 at the inlet end of the drum 2. Feed chute 16, an ammonia feed pipe 30, and acid feed pipe 32, pass through and are mounted upon this closure plate 28. Retaining rings 34 and 36, located at the inlet and approximate center of the drum 2, maintain a bed of material of substantial depth therein. A scraper blade 38 is supported by structural member 40 and 42 and it bears against the upper interior cylindrical surface of the drum 2 between the retaining rings 34 and 36. A lateral support rod 41 is provided for the scraper assembly.

Feed pipes 30 and 32 extend downward by and then horizontally, becoming perforated discharge pipes 44 and 46 supported by brackets 48 so as to dip below the surface of the material.

The discharge end of the drum 2 is provided with a plurality of longitudinally extending compartments 50, each transversely shaped like an open figure six (6), each having a substantially plane back 52 and a circular retaining wall or portion 54. These compartments 50 are placed about the interior of the drum 2 with the respective walls of the compartments having the same order so that the retaining wall 54 joins and is welded to the rolling wall 52 of the adjacent compartment.

Transverse fragmentary partitions 56, 58, 60, and 62 are positioned around the compartments 50, one being provided at each end to close the space back of the compartments so that there are three transverse spaces as shown in FIG. 2 lengthwise of the drum between each adjacent pair of compartments.

Each such small separate space between the compartments is provided with a reasonably heavy knocking ball 64.

These balls 64 knock against angles 66, 68, and 70 welded around the circular portion of each compartment 50 in positions to afford normal knocking surfaces against the partitions by the balls as they roll in the separate spaces of the drum 2.

Stops or chocks 72 and 74 are spaced to retain the balls 64 for a portion of the rotation of the drum 2 so that upon the release of the balls 64 from the stops 72 or 74, a definite impact is obtained by the balls 64 knocking against the angles 66, 68, and 70 on the compartments 50.

Hand holes are placed in each casing so that the balls 64 may be inserted therein and removed therefrom. An exhaust fan, not shown, is connected by means of exhaust duct 76 to the discharge end of the drum 2. This duct 76, as well as discharge chute 18, is mounted on a circular cap plate 78 which is supported on the framework 12 by structural cross members 80.

In this construction, the fertilizer or other material is fed at a constant rate through feed chute 16 into drum 2. A bed of material builds up within the drum 2 due to the presence of the retaining ring 36. As the drum 2 rotates, the material is tumbled over and around the acid and ammonia discharge pipes 44 and 46. As a result, a thorough mixing of the material with the acid and ammonia takes place.

The reaction is exothermic and the heat liberated causes vaporization of some of the water present. Masses of moist material adhering to the sides of the drum 2 are scraped off as they pass to the scraper blade 38 and fall back into the bed. As the bed of ammoniated material is built up, it flows over the retaining ring 36 into the adjacent compartments 50.

As the drum 2 rotates in the clockwise direction as shown by the arrow in FIG. 4, depending upon how full each compartment 50 may be, and depending upon the fluidity of the material, material will begin to be poured from one compartment 50 and roll down the rolling wall of the next or other compartment to the right.

Each compartment 50 will be emptied before it is ready to receive further material being poured therein from the upper compartments. Heated air from the ammoniating reaction is drawn lengthwise of the drum toward the discharge end. It is replaced by cool dry air which is drawn through inlet chute 16 with the incoming material, and which is then passed over the reacting materials in the ammoniating process. The hot air surface hardens the granules as they cascade from compartment to compartment and roll over the plane surfaces of the granulator.

The action of the striking balls 64 during the rotation of the drum 2 will now be described. As shown in FIG. 4, ball 64A is resting against one angle 68 and back of one stop 74. Upon the continued clockwise rotation of the drum 2, ball 64A assumes the position of ball 64B and with the continued rotation the ball drops from the stop 74 to the position of ball 64C where it has struck the angle 66 with considerable force to break loose any fertilizer or other material stuck to the lower end of the wall 52.

Upon the continued rotation of the drum 2, ball 64C assumes the position of ball 64D where it is nearly ready to engage the stop 72 and slight further clockwise movement of the drum 2 will release the ball from stop 72 to angle 70 with a hard blow which will release material from the retaining wall lip at 54. As the drum 2 further rotates clockwise, the ball will roll over the retaining wall next to the inside of the drum 2 to the position shown at 64A where it will be ready for its next two forceful blows, first upon the plane wall 52 of the compartment 50 and then upon the retaining wall 54 of the compartment, so that every compartment receives a blow on each side with every revolution of the drum 2.

Since there are three separate fragmentary casings lengthwise of the drum 2 between each two compartments, each having a ball 64 therein, each compartment will receive a multiplicity of blows substantially throughout its length with every revolution of the drum 2.

A blast pipe 82 for the introduction of hot or cold air and a circular support 84 are shown in the drawings of the present embodiment. Both blast pipe 82 and support 84 function as supports for structural members on which the scraper blade 38 and chemical discharge pipes depend.

It will be apparent that in this new combined ammoniator-granulator machine, the heat generated by the chemical action of ammonia and acid upon a fertilizer or other material is retained and serves to facilitate the pelletizing action. Also any otherwise wasted ammonia fumes are further placed in contact with the pellets as they form in the granulator chambers. Furthermore it can be seen that the air flow moving down the feed chute 16 aids the flow of the material being introduced by keeping it dry and in motion. In its passage through the ammoniator, the air cools the reacting materials. A desirable further agitation of materials in the ammoniating chamber results from the vibrations telegraphed along the drum 2 by the blows of the granulator balls 64.

It can be seen, too, that the combined apparatus saves considerable plant space by employing one motive power source and requiring no transfer means for conveying semifinished material between the units. By granulating a substantially greater portion of the initial material to a final product, in the desirable range of particle sizes, the feed-back of fines for reprocessing is much reduced. The less adulterated input of raw material results in a uniform formula of input giving better control of the ammoniating process, a more continuous operation and greater yield of high strength, commercially acceptable sized product of high analysis.

Obviously many modification and variation of the present invention are possible in light of the above teachings. It is, therefore, to be understood that within the scope of the appended claims the invention may be practiced otherwise than as specifically described.

What is claimed is:

1. A combined ammoniator-granulator apparatus for preparing fertilizer and similar materials, comprising, structure defining a continuous rotatable drum mounted to slope downwardly from the horizontal to progress material therethrough upon axial rotation thereof, spaced roller means for supporting said continuous drum for axial rotation about its longitudinal axis, means including a single chain drive and a single power source connected thereto for rotating said continuous drum, a closure for the inlet and outlet ends of said continuous drum each having an opening therein, an inlet chute and an outlet chute for said inlet and outlet ends of said continuous drum communicating with the respective openings in the closures thereof, said inlet chute being utilized to introduce dry fertilizer material into said continuous drum along the longitudinal axis thereof, an annular retaining ring for dividing the interior of said continuous drum into an integral ammoniator section and a granulator section, structure defining at least two spaced inlet passageways located below the inner edge of said retaining ring and terminating short thereof and arranged substantially parallel to the inner wall of said ammoniator section for introducing liquid chemicals into said ammoniator section, with said dry fertilizer material being mixed with said chemicals due to the location of said inlet passageways below the edge of said retaining ring, said retaining ring being arranged to cause a bed of mixed ammoniated fertilizer material to build up within said ammoniator section, a fixed scraper blade running lengthwise of said ammoniator section and spaced diametrically oppositely from said inlet passageways and from the inner wall of said ammoniator section of said tubular member for scraping the mixed ammoniated fertilizer material from the inner wall of said ammoniator section upon rotation thereof, said mixed ammoniated fertilizer material being gradually moved over said retaining wall into said granulator section of said tubular member for granulation thereof due to the rotation of said tubular member, said granulator section including a plurality of longitudinally extending compartments arranged in series along the longitudinal axis of said tubular member as well as a plurality of circularly and contiguously identical compartments spaced about the axis of rotation of said continuous drum and leaving axially therebetween a substantially circular open surface hardening area for the hardening of said mixed ammoniated fertilizer material into granules as it moves toward the output end of said continuous drum, with each compartment having a substantially plane rolling wall and an opposing retaining wall, the rolling wall of each compartment being substantially tangential to the surface hardening area and joining the retaining wall of the adjacent compartment, and the said respective walls of the several compartments being spaced in the same order about said surface hardening area, with said ammoniated fertilizer material introduced into said granulator section of said continuous drum being granulated therein, means for introducing air into said ammoniator section for mixing with the hot gases liberated during the ammoniating of the reacting materials therein and for cooling of same during the passage thereof to the outlet end of said continuous drum, means for drawing the reaction gases from the ammoniator section through said continuous drum for hardening the granules of material as they are granulated and cascaded from compartment to compartment and roll over the surface hardening area of said granulator section prior to being disposed through said outlet chute, and means including weights positioned adjacent the outer sides of the compartments and movable always in a direction opposite to the direction of rotation of said continuous drum for consecutively striking the sides of the compartments to release material from the compartments and cause reverberations throughout the entire apparatus to speed the chemical reaction and maintain suspension of said material, with the ammonia gases, heat of reaction, moisture tumbling and agitation being a common chemical linkage in one direction of movement of the material and with the telegraphing of the weight-dropping blows reverberating back to the incoming material by the continuous drum being a common linkage in the opposite direction of flow of the material, with said linkages serving to facilitate the ammoniating, granulating, and pelletizing of said material in said drum.

2. An arrangement as recited in claim 1, wherein the means including the weights for striking the sides of the compartments are arranged to be released when the compartments are in their upper discharging positions.

3. An arrangement as recited in claim 2, wherein the means including the weights for striking the sides of the compartments are arranged to be returned to their original starting positions.

References Cited in the file of this patent
UNITED STATES PATENTS

| 1,960,030 | Sackett | May 22, 1934 |
| 2,674,522 | Takewell et al. | Apr. 6, 1954 |
| 2,710,423 | Douglas | June 14, 1955 |
| 2,729,554 | Nielsson | Jan. 3, 1956 |
| 2,871,510 | Sackett | Feb. 3, 1959 |
| 2,885,279 | Mortenson | May 5, 1959 |